Oct. 16, 1951  C. C. FUERST ET AL  2,571,702
STABILIZER FOR CAMERA SHUTTER TRIP MECHANISMS
Filed March 31, 1950
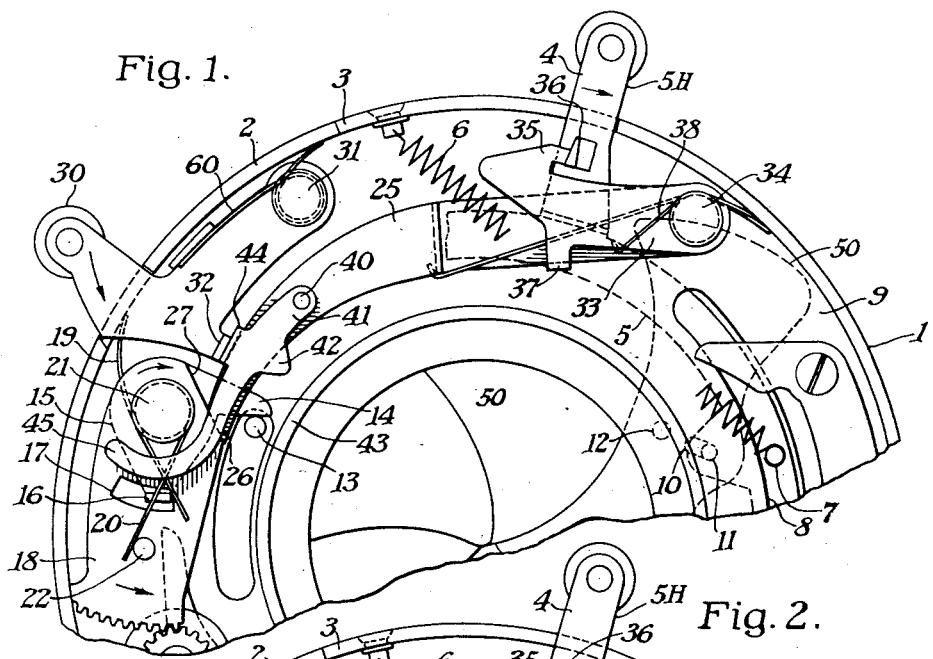
Fig. 1.
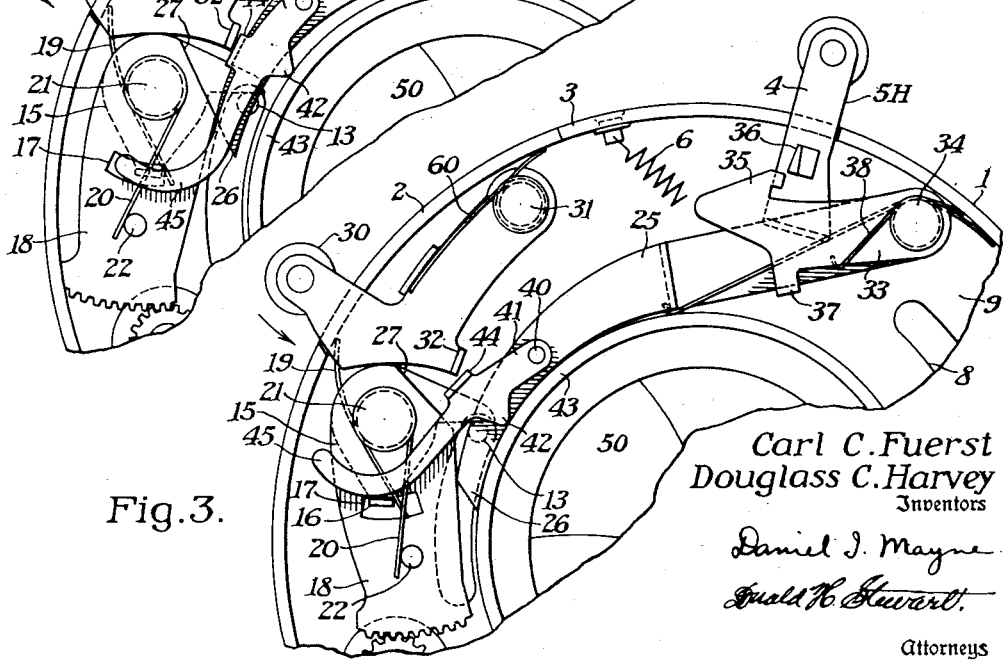
Fig. 2.
Fig. 3.
Carl C. Fuerst
Douglass C. Harvey
Inventors
Attorneys Patented Oct. 16, 1951

2,571,702

UNITED STATES PATENT OFFICE 2,571,702

STABILIZER FOR CAMERA SHUTTER TRIP MECHANISM

Carl C. Fuerst and Douglass C. Harvey, Rochester, N. Y., assignors to Eastman Kodak Company, Rochester, N. Y., a corporation of New Jersey Application March 31, 1950, Serial No. 153,257

4 Claims. (Cl. 95—63)

This invention relates to camera shutters and particularly to a means for stabilizing the operation of shutter triggers. One object of our invention is to provide a shutter trigger stabilizing mechanism which is designed to prevent premature operation of a shutter trip lever. Another object of our invention is to provide a mechanism to insure proper operation of a power-operated shutter release, even when the shutter trigger is improperly operated. A still further object of our invention is to provide a mechanism insuring the proper operation of a shutter release, regardless of the method of operating a shutter trigger—either manually or by solenoid, such as is frequently used with cameras designed for present photography and flash or flood lamps. Other objects will appear from the following specification, the novel features being particularly pointed out in the claims at the end thereof.

In the copending application of Carl C. Fuerst, Direct Acting Shutter for Cameras, Serial No. 728,528, filed February 14, 1947, resulting in U. S. Patent No. 2,524,786, granted October 10, 1950, there is shown a shutter mechanism in which the shutter trip mechanism is moved a predetermined distance by a shutter trigger after which a spring-actuated member takes over and moves the shutter trip lever a further distance to trip the shutter. Since the time of operation of this spring-operated shutter trip is important to properly synchronize a flash lamp, it is necessary that the shutter trip be moved by the power-operated trip after movement of the trigger has stopped. While such a structure has worked entirely satisfactory for manual operation, and usually with the trigger being operated electrically, it, nevertheless, occasionally happens that a very powerful solenoid may be used to operate the trigger so that the trigger is moved so rapidly that it has the effect of a hammer striking the trip lever and, consequently, the trip lever continues to move after the trigger stops moving, thereby prematurely tripping the shutter and sometimes failing to synchronize with a flash lamp. This can readily be corrected by limiting the operating stroke of the solenoid, but since solenoid-operated attachments are usually assembled by the user, little, if any, attention is paid to adjusting the stroke of the solenoid to prevent the above-described undesirable operation. We have provided a simple attachment which can be readily built into camera shutters which will prevent the occasional improper operation of the shutters.

Coming now to the drawings wherein like reference characters denote like parts throughout:

Fig. 1 is a fragmentary top plan view of a shutter with the cover and parts of the shutter removed to show a camera tripping mechanism equipped with a preferred form of a stabilizing device to prevent improper operation of the shutter trigger. In this view the parts are shown in their normal rest position with the shutter set;

Fig. 2 is a view similar to Fig. 1 with the trip lever in its intermediate position from which it may be operated to its fully released position for tripping the shutter; and Fig. 3 is a view similar to the preceding views but with the trip lever just releasing the blade ring to make an exposure.

Our invention relates to shutters of the type shown in the above-mentioned application in which the shutter is of the type in which a blade ring is set to tension a spring being latched in its set position. A trip lever is arranged to release the latch, this trip lever being movable to a predetermined position by a trigger after which a spring-operated device continues the operation of the trip lever until the blade ring is tripped so that the blades may be operated to make an exposure. As indicated in Fig. 1, the shutter may consist of a casing 1 having an upstanding flange 2 extending around the periphery, slotted at 3 to allow movement of a setting lever 4. This setting lever 4 may have an operating handle 5H and may form a part of a blade ring 5 to which one end of a power spring 6 is attached as by means of a stud 7 operating through a slot 8 in a mechanism plate 9. The blade ring includes a series of slots 10 which engage pins 11, one for each shutter blade, to turn the shutter blades about their pivots 12. Thus, all of the shutter blades are operated together and turn in only one direction in making an exposure which, in this instance, is in a counterclockwise direction.

The blade ring likewise has a pin 13 adapted to engage one arm 14 of a bell-crank lever 15, the other arm of which 16 projects through a slot 17 in a gear segment 18 normally spring-pressed in a clockwise direction by a spring 19. The gear segment 18 constitutes a power-operated member which is connected to the bell-crank lever 15 by means of a powerful spring 20 encircling the stud 21 and engaging a pin 22 and the lug 15. This spring tends to move member 18 in the direction shown by the arrow in Fig. 1, but in this view a latch lever 25 is in such a position that the end of the latch 26 engages the beveled surface 27 of the power-operated member and is held against such movement. There is a light spring 19 encircling the stud 21 having one edge resting on the case and the other end lying directly beneath the arm of spring 20 lying against lug 16. This spring tends to turn member 18 and the bell-crank in a clockwise direction when the lug 16 contacts with the end of the slot 17. Thus, the function is that with the bell-crank lever 15 held set as in Fig. 1, spring 20 exerts a torque on pin 22 which will overcome spring 19 as soon as the latching lever 25 has moved a sufficient distance to release surface 26 of this lever from the beveled surface 27.

This occurs when the trigger 30 is moved about its pivot 31, causing arm 32 of the trigger to move the latch lever 25 to an intermediate position, as shown in Fig. 2. The latch lever 25 is provided with a latch element 33 pivoted at 34 to the casing and having a hook 35 adapted to engage a lug 36 on the blade ring setting lever 4. A flange 37 permits the downward thrust of the latch lever 25 to move the latch member 33 and also permits the latch member to move downwardly when the setting lever 4 is turned in the direction shown by the arrow in Fig. 1 towards its set position shown in this figure to snap past latch element 36. A light spring 38 tends to hold the latch element 33 in the position shown.

As thus far described, the tripping mechanism is like that shown in the above-mentioned Fuerst application, except that in the Fuerst application the lug 32 on the trigger 30 directly engages the latch lever 25.

In the present instance, this is not the case. In accordance with our invention, the latch lever 25 is provided with a stud 40 which carries a pivoted lever 41. This lever includes a projection 42 extending downwardly; this extension being such that after limited movement of the lever 25 it will strike a stop on the shutter casing, here shown as a tubular flange 43. Between the latch lever 25 and the trigger lug 32 there is a flange 44 carried by the lever 41 so that this flange may contact with both the trigger and the latch lever 25. The end of lever 41 extends beyond the flange and projection, as indicated at 45, to form a weighted arm and, in the present instance, this arm is curved to provide clearance for parts of the shutter, such as the pin 22 on the power-operated member 18.

The function of lever 41 is to momentarily halt movement of the latch lever 25 at a predetermined intermediate position between its set position shown in Fig. 1 and its trip position shown in Fig. 3; this intermediate position being shown in Fig. 2. This intermediate position of the trip lever is approximately at the point where the power-operated member 18 takes over movement of the trip lever from the trigger. In other words, when the trigger 30 is depressed, the latch lever 25 will be moved in a tripping direction to the position shown in Fig. 2, but this movement is insufficient to release the latch elements 35 and 36. From this position for proper synchronization it is necessary that the trip lever be moved by the power-operated device 18 so that it will always move at uniform speed and that after such movement the shutter blades 50 will move a uniform time before reaching a fully open position. This uniform time is exceedingly slight and is preferably a comparatively few milliseconds so that, so far as the operation of the shutter goes, it would appear as if the shutter operates instantaneously upon release of the trigger 30.

As above explained, if a very powerful solenoid is attached to the trigger, such as may be used by certain press photographers, the trigger 30 is moved exceedingly rapidly, much more rapidly than it could possibly be operated by hand and, consequently, these powerful solenoids actually strike the trigger causing it to act as a hammer, hitting the latch lever 25 so hard that when the trigger reaches its stop, as indicated in Fig. 2, the latch lever 25 may bounce. The stabilizer 41 avoids this by momentarily stopping the latch lever 25. This occurs when the stabilizer strikes its stop 43 because the lever 41 reacts against pivot 40 and momentarily retains the latch lever 25 in its Fig. 2 position. However, as soon as the power-operated member 18 takes over, the ends 26 and surface 27 operate to cam the latch lever 25 from its Fig. 2 to its Fig. 3 position while the latch lever 25 moves downwardly as is permitted by the pivoted lever 41 which must rock upon the projection 42 and its stop 43 during this movement. Thus, the trip lever moves away from the major portion of lever 41 as the shutter is released. Meanwhile, the trigger 30 may be released and will move to its set position under the impulse of its spring 60 as shown in Fig. 1.

The shutter may be again set by moving the setting lever 4 until the latching lug 36 thereof snaps past the latch 35 carried by the pivot 34 of latch lever 25.

As will be seen from the above description, we have provided a simple addition to the latch lever to provide a satisfactory means for momentarily arresting the movement of the latch lever 25 in the very few cases where this latch lever is struck so hard by the trigger as to bounce away from the power-operated member 18. While this can only occur when the trigger is operated at an excessively high speed, as by means of a powerful solenoid having too long a stroke, it nevertheless does not interfere in any way with the normal operation of the shutter and, consequently, is a means for definitely stabilizing the operation of this trip mechanism to prevent improper operation thereof.

It is obvious that, while the above-described arrangement is a preferred form of our invention which accomplishes the objects of our invention, other forms may readily be devised so that we consider within the scope of our invention all such forms as may come within the scope of the appended claims.

Having thus described our invention, what we claim is new and desire to secure by Letters Patent of the United States is:

1. A shutter trip stabilizer for shutters of the type including an apertured casing, a plurality of symmetrically shaped shutter blades pivotally mounted in the casing and adapted to open and close the aperture, a blade ring operatively attached to the blades and movable to move the blades, a power drive for the blade ring, a shutter trigger having limited movement, a protuberance carried by the blade ring, a latch for coacting with the blade ring protuberance, a latch lever for operating the latch, and a power-operated shutter release for engaging and driving the latch lever, said shutter trip stabilizer comprising means carried by the latch lever and movable relative thereto and engageable by the trigger for tending to stop the movement of the latch lever at an intermediate position before the shutter is released and in position for the power-operated shutter release to move the latch lever to complete the release of the shutter, said means comprising a lever pivotally attached at one end to the latch lever and having a projection on one side, a stop on the shutter in the path of the projection, a flange on said pivoted lever extending between the latch lever and trigger, whereby pressure on the trigger may move the latch lever by the flange until the projection strikes the stop.

2. A shutter trip stabilizer for shutters of the type including an apertured casing, a plurality of symmetrically shaped shutter blades pivotally mounted in the casing and adapted to open and close the aperture, a blade ring operatively attached to the blades and movable to move the blades, a power drive for the blade ring, a shutter trigger having limited movement, a protuberance carried by the blade ring, a latch for coacting with blade ring protuberance, a latch lever for operating the latch, and a power-operated shutter release for engaging and driving the latch lever, said shutter trip stabilizer comprising means carried by the latch lever and movable relative thereto and engageable by the trigger for tending to stop the movement of the latch lever at an intermediate position before the shutter is released and in position for the power-operated shutter release to move the latch lever to complete the release of the shutter, said means comprising a lever pivotally attached at one end to the latch lever and having a projection on one side, a stop on the shutter in the path of the projection, a flange on said pivoted lever extending between the latch lever and trigger, whereby pressure on the trigger may move the latch lever by the flange until the projection strikes the stop, and a weighted arm on the end of the pivoted lever spaced from the pivot thereof and spaced from the projection and flange.

3. A shutter trip stabilizer for shutters of the type including an apertured casing, a plurality of symmetrically shaped shutter blades pivotally mounted in the casing and adapted to open and close the aperture, a blade ring operatively attached to the blades and movable to move the blades, a power drive for the blade ring, a shutter trigger having limited movement, a protuberance carried by the blade ring, a latch for the blade ring protuberance, a latch lever for operating the latch, and a power-operated shutter release for engaging and driving the latch lever, said shutter trip stabilizer comprising a lever pivotally attached to the latch lever and including a projection extending to one side thereof, a stop in the path of movement of the extension, a flange on said pivoted lever extending between the trigger and latch lever, the lever projection tending to limit the movement of the latch lever to an intermediate position when the latch lever is depressed through the flange by the trigger, the power-operated shutter release moving the latch lever from its intermediate position to trip the shutter, thereby causing the lever to turn upon its pivot and the latch lever to move away from the flange thereof.

4. A shutter trip stabilizer for shutters of the type including an apertured casing, a plurality of symmetrically shaped shutter blades pivotally mounted in the casing and adapted to open and close the aperture, a blade ring operatively attached to the blades and movable to move the blades, a power drive for the blade ring, a shutter trigger having limited movement, a protuberance carried by the blade ring, a latch for the blade ring protuberance, a latch lever for operating the latch, and a power-operated shutter release for engaging and driving the latch lever, said shutter trip stabilizer comprising a lever pivotally attached to the latch lever and including a projection extending to one side thereof, a stop in the path of movement of the extension, a flange on said pivoted lever extending between the trigger and latch lever, the lever projection tending to limit the movement of the latch lever to an intermediate position when the latch lever is depressed through the flange by the trigger, the power-operated shutter release moving the latch lever from its intermediate position to trip the shutter, thereby causing the lever to turn upon its pivot and the latch lever to move away from the flange thereof, said projection including a rounded end contacting with the stop on the shutter, whereby said pivoted lever may rock about the flange and stop as the latch lever is moved by the power-operated shutter release to trip the shutter.

CARL C. FUERST.
DOUGLASS C. HARVEY.

No references cited.